United States Patent
Ramakrishnan (10) Patent No.: US 11,159,377 B2
(45) Date of Patent: Oct. 26, 2021

(54) FRONT-HAUL PLUG-AND-PLAY CONFIGURATION FOR A C-RAN

(71) Applicant: CommScope Technologies LLC, Hickory, NC (US)

(72) Inventor: Shanthakumar Ramakrishnan, Westford, MA (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/569,470

(22) Filed: Sep. 12, 2019

(65) Prior Publication Data

US 2020/0092171 A1 Mar. 19, 2020

Related U.S. Application Data

(60) Provisional application No. 62/730,873, filed on Sep. 13, 2018.

(51) Int. Cl.
*H04L 12/00* (2006.01)
*H04L 12/24* (2006.01)
*H04L 12/46* (2006.01)

(52) U.S. Cl.
CPC ...... *H04L 41/0886* (2013.01); *H04L 12/4641* (2013.01); *H04L 41/0893* (2013.01); *H04L 41/12* (2013.01)

(58) Field of Classification Search
CPC . H04L 41/12; H04L 41/0886; H04L 12/4641; H04L 41/0893; H04B 7/0626
USPC .................................................. 709/223–226
See application file for complete search history.

(56) References Cited

U.S. PATENT DOCUMENTS

| 9,380,466 | B2 | 6/2016 | Eyuboglu et al. |
| 9,414,399 | B2 | 8/2016 | Eyuboglu et al. |
| 9,781,723 | B2* | 10/2017 | Agardh ................. H04L 5/0044 |
| 9,936,470 | B2 | 4/2018 | Eyuboglu et al. |
| 10,057,916 | B2 | 8/2018 | Barabell et al. |

(Continued)

FOREIGN PATENT DOCUMENTS

| KR | 20160137420 A | 11/2016 | |
| WO | 2007076621 A1 | 7/2007 | |
| WO | WO-2007076621 A1 * | 7/2007 | ............. H04L 45/02 |

OTHER PUBLICATIONS

International Searching Authority, "International Search Report and Written Opinion from PCT Application No. PCT/US2019/050882", from Foreign Counterpart to U.S. Appl. No. 16/569,470, dated Feb. 6, 2020, pp. 1-10, Published: WO.

(Continued)

*Primary Examiner* — Frantz Coby
(74) *Attorney, Agent, or Firm* — Fogg & Powers LLC (57) ABSTRACT

This disclosure relates to automatically configuring a front-haul switched Ethernet network for a C-RAN. The topology of the front-haul switched Ethernet network is automatically discovered. One or more switches in the front-haul switched Ethernet network are automatically configured. The configuration of the one or more switches in the front-haul switched Ethernet network is automatically verified. The discovered topology can be automatically verified. Also, the discovered topology or the configuration of the front-haul switched Ethernet network can be automatically validated to check if it corresponds to a network design for the front-haul switched Ethernet network.

25 Claims, 2 Drawing Sheets

(56) References Cited

U.S. PATENT DOCUMENTS

| | | | |
|---|---|---|---|
| 10,064,072 B2 | 8/2018 | Eyuboglu et al. | |
| 10,142,858 B2 | 11/2018 | Eyuboglu et al. | |
| 10,236,959 B2* | 3/2019 | Bengtsson | H04L 5/0055 |
| 10,292,175 B2 | 5/2019 | Eyuboglu et al. | |
| 10,455,597 B2 | 10/2019 | Eyuboglu et al. | |
| 10,499,409 B2* | 12/2019 | Shattil | H04W 72/1215 |
| 2006/0062211 A1* | 3/2006 | Manthoulis | H04L 41/12 |
| | | | 370/386 |
| 2015/0215044 A1 | 7/2015 | Cvijetic et al. | |
| 2017/0135121 A1* | 5/2017 | Eyuboglu | H04B 7/0626 |
| 2018/0167993 A1* | 6/2018 | Thakkar | H04W 48/16 |
| 2018/0332614 A1* | 11/2018 | Shanmugaraju | H04W 76/27 |
| 2019/0104527 A1* | 4/2019 | Raghothaman | H04W 74/0833 |
| 2020/0077304 A1* | 3/2020 | Sandberg | H04W 28/085 |

OTHER PUBLICATIONS

Haberland et al., "Base Stations in the Cloud", Alcatel-Lucent, Sep. 28, 2012, pp. 1-23, www.alcatel-lucent.com.

Zhu et al., "Virtual Base Station Pool: Towards a Wireless Network Cloud for Radio Access Networks", May 17, 2010, pp. 1-10.

* cited by examiner

FRONT-HAUL PLUG-AND-PLAY CONFIGURATION FOR A C-RAN

CROSS-REFERENCE TO RELATED APPLICATIONS

This application claims the benefit of U.S. Provisional Patent Application Ser. No. 62/730,873, filed on Sep. 13, 2018, which is hereby incorporated herein by reference in its entirety.

BACKGROUND

A centralized radio access network (C-RAN) can be used to implement base station functionality for providing wireless service to user equipment (UE). Typically, for each cell implemented by the C-RAN, one or more baseband units (BBUs) (also referred to here as "baseband controllers") interact with multiple remote units (also referred to here as "radio points" or "RPs"). Each BBU is coupled to the radio points over front-haul communication links or a front-haul network.

Historically, the front-haul of a C-RAN is implemented using point-to-point fiber optic links, where each radio point is coupled to a corresponding BBU over one or two optical fibers.

More recently, switched Ethernet networks have been used to implement the front-haul of a C-RAN. However, manually configuring a C-RAN front-haul implemented using a switched Ethernet network can be more complicated and time consuming.

SUMMARY

One embodiment is directed to a system to provide wireless service. The system comprises a controller and a plurality of radio points. Each of the radio points is associated with at least one antenna and remotely located from the controller, wherein the plurality of radio points is communicatively coupled to the controller using a front-haul switched Ethernet network comprising one or more switches and having an associated topology. The controller and the plurality of radio points are configured to implement a base station in order to provide wireless service to a plurality of user equipment (UEs) using a cell. The controller is communicatively coupled to a core network of a wireless service provider. The system is configured to automatically configure the front-haul switched Ethernet network by doing the following: automatically discovering the topology of the front-haul switched Ethernet network; automatically configuring the one or more switches in the front-haul switched Ethernet network; and automatically verifying the configuration of the one or more switches in the front-haul switched Ethernet network.

Another embodiment is directed to a method for automatically configuring a front-haul switched Ethernet network for a system comprising a controller and a plurality of radio points. Each of the radio points is associated with at least one antenna and remotely located from the controller. The plurality of radio points is communicatively coupled to the controller using the front-haul switched Ethernet network. The front-haul switched Ethernet network comprising one or more switches and having an associated topology. The controller and the plurality of radio points are configured to implement a base station in order to provide wireless service to a plurality of user equipment (UEs) using a cell. The controller is communicatively coupled to a core network of a wireless service provider. The method comprises automatically discovering the topology of the front-haul switched Ethernet network; automatically configuring the one or more switches in the front-haul switched Ethernet network; and automatically verifying the configuration of the one or more switches in the front-haul switched Ethernet network.

Other embodiments are disclosed.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
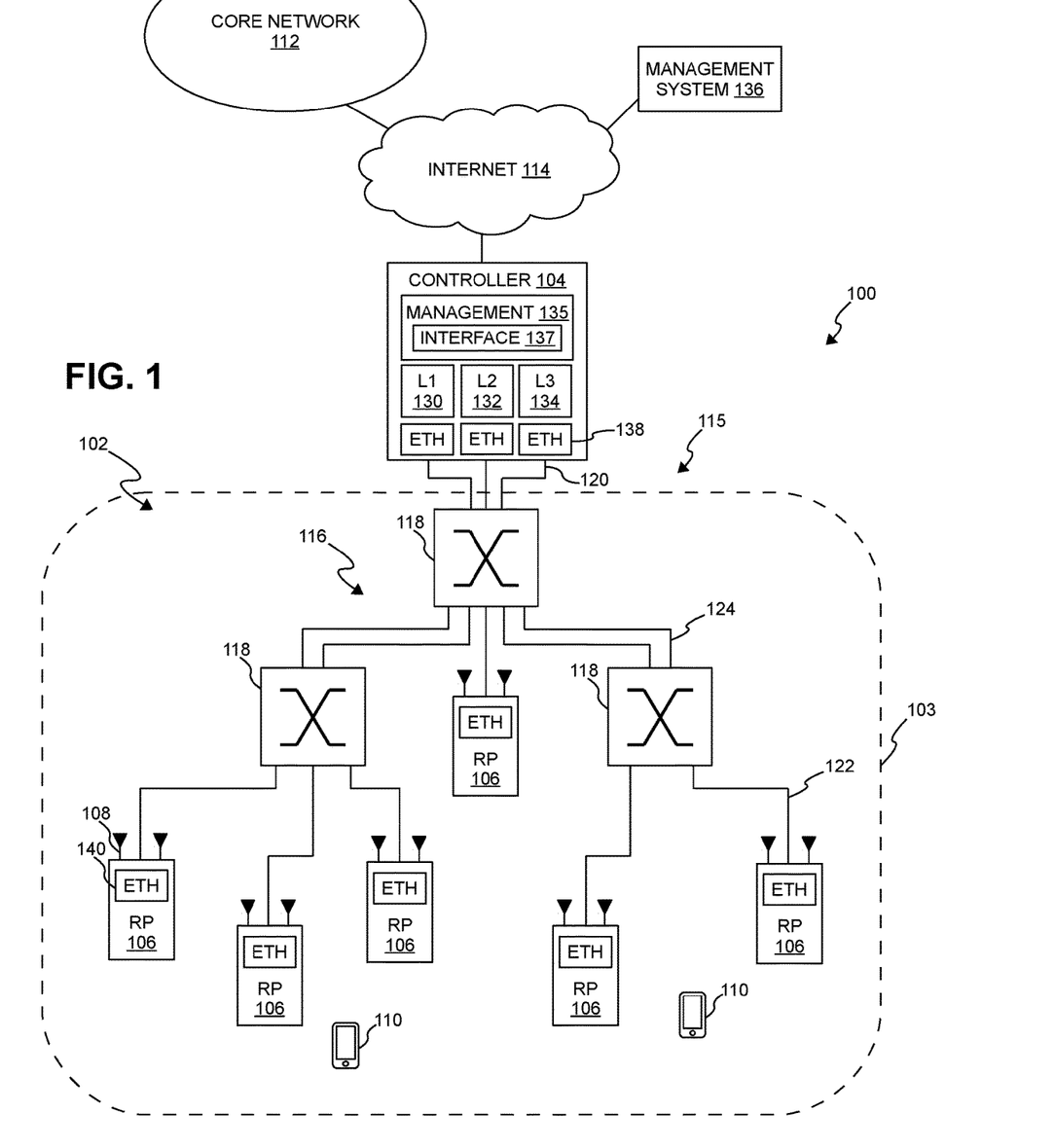
FIG. 1 is a block diagram illustrating one exemplary embodiment of a radio access network (RAN) system in which the front-haul plug-n-play configuration techniques described here can be implemented.

FIG. 1 is a block diagram illustrating one exemplary embodiment of a radio access network (RAN) system 100 in which the front-haul plug-n-play configuration techniques described here can be implemented. The system 100 is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN architecture that employs at least one baseband unit 104 and multiple radio points (RPs) 106. The system 100 is also referred to here as a "C-RAN system" 100. Each RP 106 is remotely located from the baseband unit 104. Also, in this exemplary embodiment, at least one of the RPs 106 is remotely located from at least one other RP 106. The baseband unit 104 and RPs 106 serve at least one cell 103. The baseband units 104 are also referred to here as "baseband controllers" 104 or just "controllers" 104.

Each RP 106 includes or is coupled to one or more antennas 108 via which downlink RF signals are radiated to user equipment (UE) 110 and via which uplink RF signals transmitted by UEs 110 are received. More specifically, in the example shown in FIG. 1, each RP 106 comprises two antennas 108. Each RP 106 can include or be coupled to a different number of antennas 108.

The system 100 is coupled to the core network 112 of each wireless network operator over an appropriate back-haul. In the exemplary embodiment shown in FIG. 1, the Internet 114 is used for back-haul between the system 100 and each core network 112. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Moreover, in this exemplary embodiment, each controller 104 communicates with the MME and SGW in the EPC core network 112 using the LTE S1 interface and communicates with other eNodeBs using the LTE X2 interface. For example, each controller 104 can communicate with an outdoor macro eNodeB (not shown) (or another controller 104 implementing a different eNodeB) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary embodiment shown in FIG. 1, the front-haul 115 that communicatively couples each controller 104 to the one or more RPs 106 is implemented using a standard switched ETHERNET network 116. However, it is to be understood that the front-haul between the controllers 104 and RPs 106 can be implemented in other ways.

The switched Ethernet network 116 comprises one or more Ethernet switches 118. Each baseband controller 104 is communicatively coupled to one or more switches 118 via a respective one or more Ethernet links 120 (which are also referred to here as "baseband controller Ethernet links"). Each RP 106 is communicatively coupled to one or more switches 118 via a respective one or more Ethernet links 122 (which are also referred to here as "RP Ethernet links"). Also, some of the switches 118 are communicatively coupled to each over via one or more Ethernet links 124 (also referred to here as "switch Ethernet links").

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in (L1) FIG. 1, each baseband controller 104 comprises Layer-1 (L1) functionality 130, Layer-2 (L2) functionality 132, and Layer-3 (L3) functionality 134 configured to perform at least some of the Layer-1 processing, Layer-2 processing, and Layer-3 processing, respectively, for the LTE air interface implemented by the RAN system 100. Each RP 106 includes (optionally) Layer-1 functionality (not shown) that implements any Layer-1 processing for the air interface that is not performed in the controller 104 and one or more radio frequency (RF) circuits (not shown) that implement the RF front-end functions for the air interface and the one or more antennas 108 associated with that RP 106.

Each baseband controller 104 can be configured to perform all of the digital Layer-1, Layer-2, and Layer-3 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 116 is able to deliver the required high data rate.

If the front-haul ETHERNET network 116 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain before the Inverse Fast Fourier Transform (IFFT) is performed in the case of downlink data and after Fast Fourier Transform (FFT) is performed in the uplink. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference.

Where frequency-domain IQ data is front-hauled between the controllers 104 and the RPs 106, each baseband controller 104 can be configured to perform all or some of the digital Layer-1, Layer-2, and Layer-3 processing for the air interface. In this case, the Layer-1 functions in each RP 106 can be configured to implement the digital Layer-1 processing for the air interface that is not performed in the controller 104.

Where the front-haul ETHERNET network 116 is not able to deliver the data rate need to front haul (uncompressed) time-domain IQ data, the time-domain IQ data can be compressed prior to being communicated over the ETHERNET network 116, thereby reducing the data rate needed communicate such IQ data over the ETHERNET network 116.

Data can be front-hauled between the controllers 104 and RPs 106 in other ways.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

In the exemplary embodiment shown in FIG. 1, a management system 136 is communicatively coupled to the controllers 104 and RPs 106, for example, via one or more networks (such as a local area network (LAN) that can include, for example, ETHERNET network 116 and/or a wide area network (WAN) that can include, for example, the Internet 114 and/or the core network 112)). Also, in some implementations, the management system 136 sends and receives management communications to and from the controllers 104, each of which in turn forwards relevant management communications to and from the RPs 106.

Each controller 104 implements management functionality 135 that, among other things, is configured to automatically configure the front-haul 115 as described below. Also, the management functionality 135 can implement a management interface 137 by which a user is able to directly interact with the controller 104. This management interface 137 can be implemented in various ways including, for example, by implementing a web server that serves web pages that implement a web-based graphical user interface for a user to interact with the controller 104 using a web browser and/or by implementing a command-line interface by which a user is able to interact with the controller using secure shell (SSH) software.

In the exemplary embodiment shown in FIG. 1, each controller 104 comprises multiple Ethernet interfaces 138 for connecting the controller 104 to the ports of one or more Ethernet switches 118. More specifically, in the example shown in FIG. 1, one of the Ethernet interfaces 138 is used for communicating timing-related and management data (for example, IEEE 1588 Precision Time Protocol (PTP) messages and Simple Object Access Protocol (SOAP)/Extensible Markup Language (XML) messages) and one or more of the Ethernet interfaces 138 are used for communicating data used for generating the air-interface radio frequency signals that are ultimately wirelessly communicated over the air interface to the UE 110. This data can be in the form of time-domain IQ baseband data and/or frequency-domain IQ baseband data, and this data is also referred to here as "IQ data." However, it is to be understood that, although this data is referred to here as IQ data, this data can comprise other forms of data.

Also, each radio point 106 comprises one or more Ethernet interfaces 140. In this exemplary embodiment shown in FIG. 1, each radio point 106 comprises one Ethernet interface 140 for connecting the radio point 106 to a port of one of the Ethernet switches 118. In this case, both timing and IQ data are communicated over that Ethernet interface 140 and link.

In other embodiment one or more of the radio points 106 can also be configured to use multiple Ethernet interfaces 140 for connecting the radio point 106 to the font-haul 115. Where multiple Ethernet interfaces 140 are used, timing data can be communicated over one or more Ethernet interfaces 140 and IQ data can be communicated over a different set of one or more Ethernet interfaces 140. Alternatively, where multiple Ethernet interfaces 140 are used, timing data can be communicated over one or more Ethernet interfaces 140 that are used for communicating IQ data.

Each Ethernet interface 138 and 140 of each controller 104 and each radio point 106 has an associated Media Access Control (MAC) address that is permanently assigned to that Ethernet interface 138 or 140 in the conventional manner.

As a part of configuring the C-RAN system 100, each Ethernet interface 138 of each controller 104 and each Ethernet interface 140 of each radio point 106 that is used for communicating over the Ethernet network 116 must be assigned an IP address.

An IP address can be manually assigned to each controller 104 (for example, using the management application 136).

In one exemplary embodiment, the IP addresses are assigned to the radio points 106 during a discovery process. The discovery process is performed in response to a radio point 106 being added to the system 100. A radio point 106 can be added to the system 100, for example, by connecting one or more of the Ethernet interfaces 140 of the radio point 106 to a respective one or more ports of one or more Ethernet switches 118 and powering on the radio point 106. The discovery process, in this embodiment, involves the radio point 106 transmitting messages to announce its presence to all controllers 104 that are coupled to the Ethernet network 116. In response to such an announcement message, each controller 104 checks to see if the radio point's MAC address (which is included in the announcement message) is included in that controller's white list. If it is, the controller 104 sends a response message to the radio point 106. The controller 104 assigns IP addresses to the radio point 106 (more specifically, assigns an IP address to each Ethernet interface 140 of the radio point 106) and sends a response message to the radio point 106 that includes the assigned IP addresses and one or more IP addresses assigned to that serving controller 104 for use by that the radio point 106 in communicating with the server controller 104 over the front-haul 115. If the radio point's MAC address is not included in a given controller's white list, then that controller 104 ignores that announcement message and does not send a response message.

The front-haul 115 also needs to be configured for use with the C-RAN system 100. For example, in the embodiment described here in connection with FIG. 1, configuring the front-haul 115 involves configuring any link aggregation (LA) used in the Ethernet network 116, any Internet Group Management Protocol (IGMP) snooping, virtual local area networks (VLANs) used for communicating timing and IQ data (also referred to here as the "timing VLAN" and the "IQ VLAN," respectively), and quality of service (QoS).

Figure 2:
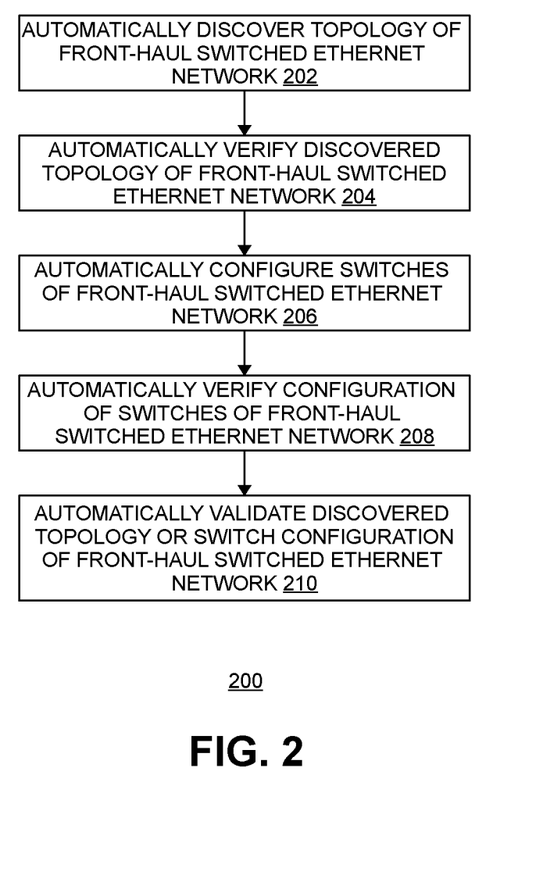
FIG. 2 comprises a high-level flow chart illustrating one exemplary embodiment of a method of automatically configuring the front-haul in a C-RAN.

One example of a method of automatically configuring the front-haul 115 of the C-RAN system 100 is shown in FIG. 2. The is automatic configuration of the front-haul 115 is automatic in the sense that it does not require a user to perform the configuration actions (though the user may initiate the overall process) and is of a "plug-and-play" nature.

FIG. 2 comprises a high-level flow chart illustrating one exemplary embodiment of a method 200 of automatically configuring the front-haul in a C-RAN. The embodiment of method 200 shown in FIG. 2 is described here as being implemented in the C-RAN system 100 of FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 is described here as being performed for each system 100 at least in part by a controller 104. The particular controller 104 that is performing at least a part of method 200 is referred to here as the "current" controller 104.

Method 200 comprises automatically discovering the topology of the front-haul switched Ethernet network 116 (block 202). This can be done using any suitable tool, protocol, or technique including, for example, any open tool, protocol, or technique such as the Simple Network Management Protocol (SNMP), or the Link Layer Discovery Protocol (described in IEEE 802.1AB and IEEE 802.3-2012 section 6 clause 79), ping, or traceroute, or any proprietary tool, protocol, or technique such as the Cisco Discovery Protocol.

In one implementation of this embodiment, the current controller 104 automatically discovers the topology of the front-haul switched Ethernet network 116 as follows. In general, the current controller 104 first discovers the Ethernet switches 118 in the front-haul 115 (for example, using LLDP and/or ping). Then, the controller 104 uses SNMP to recursively download routing tables and SNMP Management Information Bases (MIBs) from the discovered switches 118 in order to determine the links between ports of the switches 118, the links between the ports of the switches 118 and the controllers 104, and the links between the ports of the switches 118 and the radio points 106. Given this information, the controller 104 can determine the topology of the front-haul switched Ethernet network 116, including the location within the topology of the switches 118 and the radio points 106 (which are identified by their MAC addresses).

This topology discovery can be initiated automatically in response to a radio point 106 or switch 118 being added to the front-haul 115. The initiation of the topology discovery is automatic in the sense that the topology discovery is initiated without requiring a user command or other user input. For example, the discovery process can be performed in response to the current controller 104 receiving a broadcast message announcing the new radio point 106 or switch 118. The current controller 104 can be configured to listen for such broadcast messages and, in response to receiving such a broadcast message, perform the topology discovery process.

Also, this topology discovery can be initiated on-demand in response to a user command. For example, in response to a radio point 106 or switch 118 being moved in the front-haul 115. In this case, after a radio point 106 or switch 118 is moved, a user can use the management application 136 or management interface 137 to initiate the discovery process. This can also be done when a radio point 106 or a switch 118 is added to the front-haul 115 (for example, if the controller 104 is not configured to automatically initiate topology discovery).

The discovered topology for the front-haul switched Ethernet 116 can be maintained at the respective controller 104 and/or communicated to the management system 136.

The switched Ethernet network 116 may be under the control of an organization or other entity that manages all networks deployed at the site 102. That organization may disable or otherwise prevent the use of some of the discovery tools, protocols, or techniques that are to be used in connection with the topology discovery processing described above in connection with block 202. In that case, it may be necessary to have that organization enable and/or run the desired discovery tools, protocols, or techniques.

Also, where such an entity uses port-based network access control to control access to the network 116 (for example, port-based network access control implementing one or more of the IEEE 802.1X standards), the radio points 106 and the controller 104 can be configured to implement the appropriate authentication protocols so that any radio point 104 and controllers 104 added to the network 116 can be automatically authenticated. For example, where IEEE 802.1X is used, each of the radio points 106 and controllers 104 can be configured implement a supplicant entity that provides appropriate credentials to an authenticator entity running on (or otherwise associated with) the appropriate switches 118. Each authenticator entity interacts with an authentication server in order to authenticate the radio point 106 or controller 104.

Alternatively, the organization that manages the network 116 can manually authenticate any radio points 104 or controllers 104 that are added to the network 116.

Method 200 further comprises automatically verifying the discovered topology of the front-haul switched Ethernet network 116 (block 204). This is done by checking if the discovered topology for the front-haul Ethernet network complies with a predetermined policy that has been defined for the front-haul switched Ethernet network 116. For example, the policy can specify that maximum number of switches between a controller 104 and a radio point 106. This is also referred to here as the "hop count" for the radio point 106. The policy can also specify the maximum number of radio points 106 that can be accessed via a given link in the topology (and the associated ports of the relevant controller 104 and switch 118). This is also referred to as the "link budget" for the link. If some aspect of the discovered topology of the front-haul switched Ethernet network 116 does not comply with the policy, that aspect is flagged.

Information about any aspects of the discovered topology of the front-haul switched Ethernet network 116 that do not comply with the policy can be captured, stored, and displayed for a user. The user is then able to manually take action to reconfigure the front-haul switched Ethernet network 116 so that its topology complies with the policy.

Method 200 further comprises automatically configuring the switches 118 in the front-haul switched Ethernet network 116 (block 206). This configuration is automatic in the sense that it is performed by software and not by a user. Any suitable tool, protocol, or technique can be used, including, for example, any open tool, protocol, or technique such as SNMP or any proprietary tool, protocol, or technique such as the particular command-line interface supported by each switch 118. The switches 118 may need to be configured to enable the controller 104 to access and automatically configure the switches 118 by the appropriate organization or entity that manages networks at the site 102.

In this exemplary embodiment, the switches 118 in the Ethernet network 116 are automatically configured to implement the timing and IQ VLANs, as well as configured to support QoS for use with those VLANs and link aggregation and IGMP snooping for use with communicating IQ data over the IQ VLAN.

Method 200 further comprises automatically verifying the configuration of the switches 118 in the front-haul switched Ethernet network 116 (block 208). This can be done by performing tests that confirm that data flows as intended. For example, test downlink IQ data can be multicast over the IQ VLAN to various groups of RPs 106 from a controller 104, and then it can be confirmed that the test IQ data was properly received at the intended RPs 106. Similar tests can be performed with test uplink IQ data, and with timing data communicated over the timing VLAN.

The current controller 104 can be configured so that, if the configuration of switches 118 fails any of the tests, the controller 104 first attempts to automatically correct the configuration of the switches 118 if possible. If it is not possible to automatically correct the configuration, information about the failed test can be captured, stored, and displayed for a user (for example, via the management system 136 or the management interface 137). The user is then able to manually take action to correct the configuration of the switches 118.

Optionally, method 200 can further comprise automatically validating that at least one of the discovered topology for the front-haul switched Ethernet network 116 and the configuration of the front-haul switched Ethernet network 116 corresponds to a network design for the front-haul switched Ethernet network 116 (block 210).

A design for the front-haul switched Ethernet network 116 can be created using a network design tool and downloaded to the current controller 104. Also, the management system 136 or the management interface 137 of the current controller 104 can be configured to enable a user to manually enter a design for the front-haul switched Ethernet network 116. The current controller 104 can be configured to compare the topology of this network design to the discovered topology of the network 116 and/or to compare any configurations settings for the switches 118 in the network design to the configuration settings of the switches 118 in the network 116.

Each controller 104 can be configured so that, if any configuration setting of any of the switches 118 do not match the corresponding configuration setting in the network design, the controller 104 first attempts to automatically correct the configuration setting if possible. If it is not possible to automatically correct the configuration setting, information about the misconfiguration can be captured, stored, and displayed for a user (for example, via the management system 136 or the management interface 137). The user is then able to manually take action to correct the misconfiguration.

Also, information about any aspects of the discovered topology of the front-haul switched Ethernet network 116 that do not match the topology of the network design can be captured, stored, and displayed for a user. The user is then able to manually take action to reconfigure the front-haul switched Ethernet network 116 so that its topology matches the topology of the network design.

In the event that the topology of the network 116 is reconfigured in response to the topology verification described above in connection with block 204, the configuration verification described in connection with block 208, or the topology and configuration validation described above in connection with block 210, at least some of the processing associated with method 200 can be repeated in order to rediscover, re-verify, and/or re-validate the topology of the network 116 and/or to reconfigure, re-verify, and/or re-validate the settings of the switches 118 in the network 116.

Furthermore, it may be the case that it is not possible or convenient to configure the front-haul switched Ethernet network 116 in a way that complies with all aspects of the policy described above in connection with block 204. Also, it may be the case that it is not possible or convenient to configure the front-haul switched Ethernet network 116 in a way that is able to pass all of the tests described above in connection with block 208. Likewise, it may be the case that it is not possible or convenient to configure the front-haul switched Ethernet network 116 so that all aspects of the resulting network configuration match the network design. The controller 104 and/or the management system 136 can be configured so that, in the event of either of those cases, a user is able to authorize an exception and permit the processing of method 200 to proceed, and the configuration of the network 116 to be used, despite the non-compliance.

Moreover, all of the features described above in connection with FIG. 2 need not be implemented. For example, in one alternative embodiment, the optional network validation described above in connection with block 210 is not implemented but the processing associated with the other blocks 202-208 is implemented. Another alternative embodiment, can implement the topology discovery described above in connection with block 202 where it is initiated on an on-demand basis. This alternative embodiment can also implement the automatic configuration of the switches 118 described above in connection block 206 and the configuration verification described above in connection with block 208 but not the topology verification described above in connection with block 204 or the network validation described above in connection with block 210.

In another alternative embodiment, method 200 is implemented and deployed in a phased manner where a first release can implement the topology discovery described above in connection with block 202 where it is initiated on an on-demand basis. The first release can also implement the automatic configuration of the switches 118 described above in connection block 206 and the configuration verification described above in connection with block 208 but not the topology verification described above in connection with block 204 or the network validation described above in connection with block 210. Then, a second release can upgrade and extend the first release so as to also implement the topology discovery described above in connection with block 202 where it is initiated on an automatic basis instead of or in addition to being initiated on an on-demand basis. The second release can also upgrade and extend the first release so as to also implement the topology verification described above in connection with block 204 and the network validation described above in connection with block 210.

Other embodiments can be implemented in other ways. For example, the processing of method 200 is described above as being performed by a controller 104. However, it is to be understood that at least some of the processing described above as being performed by the controller 104 can be performed by a different entity, such as the management system 136.

The processing associated with method 200 enables the front-haul switched Ethernet network 116 to be automatically configured, thereby avoiding the use of complicated and time consuming manual configuration processes. Thus, from the perspective of the personnel installing the controllers 104 and radio points 106, the configuration of the front-haul 115 will generally be a "plug-and-play" process.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service comprising: a controller; and a plurality of radio points; wherein each of the radio points is associated with at least one antenna and remotely located from the controller, wherein the plurality of radio points is communicatively coupled to the controller using a front-haul switched Ethernet network comprising one or more switches and having an associated topology; wherein the controller and the plurality of radio points are configured to implement a base station in order to provide wireless service to a plurality of user equipment (UEs) using a cell; wherein the controller is communicatively coupled to a core network of a wireless service provider; wherein the system is configured to automatically configure the front-haul switched Ethernet network by doing the following: automatically discovering the topology of the front-haul switched Ethernet network; automatically configuring the one or more switches in the front-haul switched Ethernet network; and automatically verifying the configuration of the one or more switches in the front-haul switched Ethernet network.

Example 2 includes the system of Example 1, wherein the system is configured to automatically discover the topology of the front-haul switched Ethernet network by: discovering the switches in the front-haul switched Ethernet network; and recursively downloading routing tables and Management Information Bases (MIBs) from the discovered switches in order to determine the links between ports of the switches, the links between the ports of the switches and the controllers, and the links between the ports of the switches and the radio points.

Example 3 includes the system of any of Examples 1-2, wherein the system is configured to initiate discovery of the topology of the front-haul switched Ethernet network at least one of: automatically in response to a radio point or switch being added to the front-haul switched Ethernet network; and on-demand in response to a user input.

Example 4 includes the system of any of Examples 1-3, wherein the system is further configured to automatically verify the discovered topology of the front-haul switched Ethernet network.

Example 5 includes the system of Example 4, wherein the system is configured to automatically verify the discovered topology of the front-haul switched Ethernet network by: checking if the discovered topology for the front-haul Ethernet network complies with a predetermined policy that has been defined for the front-haul switched Ethernet network.

Example 6 includes the system of Example 5, wherein the predetermined policy specifies at least one of: a maximum hop count for the radio points and a link budget for some links coupled to the controller.

Example 7 includes the system of any of Examples 1-6, wherein the system is configured to automatically configure the one or more switches in the front-haul switched Ethernet network by automatically configuring at least one of: virtual local area networks (VLANs) for communicating timing data and in-phase and quadrature (IQ) data, quality of service (QoS), link aggregation (LA), and Internet Group Management Protocol (IGMP) snooping.

Example 8 includes the system of any of Examples 1-7, wherein the system is configured to automatically verify the configuration of the one or more switches in the front-haul switched Ethernet network by performing tests that confirm that data flows as intended.

Example 9 includes the system of any of Examples 1-8, wherein the system is further configured to automatically validate that at least one of the discovered topology for the front-haul switched Ethernet network and the configuration of the front-haul switched Ethernet network corresponds to a network design for the front-haul switched Ethernet network.

Example 10 includes the system of any of Examples 1-9, wherein the system is further configured to enable a user to enter an exception to any verification or validation performed for the switched Ethernet network.

Example 11 includes a method for automatically configuring a front-haul switched Ethernet network for a system comprising a controller and a plurality of radio points, wherein each of the radio points is associated with at least one antenna and remotely located from the controller, wherein the plurality of radio points is communicatively coupled to the controller using the front-haul switched Ethernet network, the front-haul switched Ethernet network comprising one or more switches and having an associated topology, wherein the controller and the plurality of radio points are configured to implement a base station in order to provide wireless service to a plurality of user equipment (UEs) using a cell, wherein the controller is communicatively coupled to a core network of a wireless service provider, the method comprising: automatically discovering the topology of the front-haul switched Ethernet network; automatically configuring the one or more switches in the front-haul switched Ethernet network; and automatically verifying the configuration of the one or more switches in the front-haul switched Ethernet network.

Example 12 includes the method of Example 11, wherein automatically discovering the topology of the front-haul switched Ethernet network comprises: discovering the switches in the front-haul switched Ethernet network; and recursively downloading routing tables and Management Information Bases (MIBs) from the discovered switches in order to determine the links between ports of the switches, the links between the ports of the switches and the controllers, and the links between the ports of the switches and the radio points.

Example 13 includes the method of any of Examples 11-12, wherein automatically discovering the topology of the front-haul switched Ethernet network is at least one of: initiated automatically in response to a radio point or switch being added to the front-haul switched Ethernet network; and initiated on-demand in response to a user input.

Example 14 includes the method of any of Examples 11-13, wherein the method further comprises: automatically verifying the discovered topology of the front-haul switched Ethernet network.

Example 15 includes the method of Example 14, wherein automatically verifying the discovered topology of the front-haul switched Ethernet network comprises: checking if the discovered topology for the front-haul Ethernet network complies with a predetermined policy that has been defined for the front-haul switched Ethernet network.

Example 16 includes the method of Example 15, wherein the predetermined policy specifies at least one of: a maximum hop count for the radio points and a link budget for some links coupled to the controller.

Example 17 includes the method of any of Examples 11-16, wherein automatically configuring the one or more switches in the front-haul switched Ethernet network comprises automatically configuring at least one of: virtual local area networks (VLANs) for communicating timing data and in-phase and quadrature (IQ) data, quality of service (QoS), link aggregation (LA), and Internet Group Management Protocol (IGMP) snooping.

Example 18 includes the method of any of Examples 11-17, wherein automatically verifying the configuration of the one or more switches in the front-haul switched Ethernet network comprises performing tests that confirm that data flows in the front-haul switched Ethernet network as intended.

Example 19 includes the method of any of Examples 11-18, further comprising automatically validating that at least one of the discovered topology for the front-haul switched Ethernet network and the configuration of the front-haul switched Ethernet network corresponds to a network design for the front-haul switched Ethernet network.

Example 20 includes the method of any of Examples 11-19, wherein the method further comprises enabling a user to enter an exception to any verification or validation performed for the switched Ethernet network.

What is claimed is:

1. A system to provide wireless service comprising:
a baseband unit; and
at least one radio point;
wherein the radio point is associated with at least one antenna, wherein the radio point is communicatively coupled to the baseband unit using a front-haul switched Ethernet network comprising one or more switches and having an associated topology;
wherein the baseband unit and the radio point are configured to implement a base station in order to provide wireless service to a plurality of user equipment (UEs) using a cell;
wherein the baseband unit is communicatively coupled to a core network of a wireless service provider;
wherein the system further comprises circuitry that is configured to automatically configure the front-haul switched Ethernet network by doing the following:
automatically discovering the topology of the front-haul switched Ethernet network;
automatically configuring the one or more switches in the front-haul switched Ethernet network; and
automatically verifying the configuration of the one or more switches in the front-haul switched Ethernet network.

2. The system of claim 1, wherein the circuitry system is configured to automatically discover the topology of the front-haul switched Ethernet network by:
discovering the switches in the front-haul switched Ethernet network; and
recursively downloading routing tables and Management Information Bases (MIBs) from the discovered switches in order to determine the links between ports of the switches, the links between the ports of the switches and the baseband unit, and the links between the ports of the switches and the radio point.

3. The system of claim 1, wherein the circuitry is configured to initiate discovery of the topology of the front-haul switched Ethernet network at least one of:
automatically in response to a new radio point or a new switch being added to the front-haul switched Ethernet network; and
on-demand in response to a user input.

4. The system of claim 1, wherein the circuitry is further configured to automatically verify the discovered topology of the front-haul switched Ethernet network.

5. The system of claim 4, wherein the circuitry is configured to automatically verify the discovered topology of the front-haul switched Ethernet network by:
checking if the discovered topology for the front-haul Ethernet network complies with a predetermined policy that has been defined for the front-haul switched Ethernet network.

6. The system of claim 5, wherein the predetermined policy specifies at least one of: a maximum hop count for the radio point and a link budget for some links coupled to the baseband unit.

7. The system of claim 1, wherein the circuitry is configured to automatically configure the one or more switches in the front-haul switched Ethernet network by automatically configuring at least one of: virtual local area networks (VLANs) for communicating timing data and in-phase and quadrature (IQ) data, quality of service (QoS), link aggregation (LA), and Internet Group Management Protocol (IGMP) snooping.

8. The system of claim 1, wherein the circuitry is configured to automatically verify the configuration of the one or more switches in the front-haul switched Ethernet network by performing tests that confirm that data flows as intended.

9. The system of claim 1, wherein the circuitry is further configured to automatically validate that at least one of the discovered topology for the front-haul switched Ethernet network and the configuration of the front-haul switched Ethernet network corresponds to a network design for the front-haul switched Ethernet network.

10. The system of claim 1, wherein the circuitry is further configured to enable a user to enter an exception to any verification or validation performed for the switched Ethernet network.

11. A method for automatically configuring a front-haul switched Ethernet network for a system comprising a baseband unit and at least one radio point, wherein the radio point is associated with at least one antenna and remotely located from the baseband unit, wherein the radio point is communicatively coupled to the baseband unit using the front-haul switched Ethernet network, the front-haul switched Ethernet network comprising one or more switches and having an associated topology, wherein the baseband unit and the radio point are configured to implement a base station in order to provide wireless service to a plurality of user equipment (UEs) using a cell, wherein the baseband unit is communicatively coupled to a core network of a wireless service provider, the method comprising:

automatically discovering the topology of the front-haul switched Ethernet network;

automatically configuring the one or more switches in the front-haul switched Ethernet network; and     automatically verifying the configuration of the one or more switches in the front-haul switched Ethernet network.

12. The method of claim 11, wherein automatically discovering the topology of the front-haul switched Ethernet network comprises:

discovering the switches in the front-haul switched Ethernet network; and     recursively downloading routing tables and Management Information Bases (MIBs) from the discovered switches in order to determine the links between ports of the switches, the links between the ports of the switches and the baseband unit, and the links between the ports of the switches and the radio point.

13. The method of claim 11, wherein automatically discovering the topology of the front-haul switched Ethernet network is at least one of:

initiated automatically in response to a new radio point or a new switch being added to the front-haul switched Ethernet network; and     initiated on-demand in response to a user input.

14. The method of claim 11, wherein the method further comprises:

automatically verifying the discovered topology of the front-haul switched Ethernet network.

15. The method of claim 14, wherein automatically verifying the discovered topology of the front-haul switched Ethernet network comprises:

checking if the discovered topology for the front-haul Ethernet network complies with a predetermined policy that has been defined for the front-haul switched Ethernet network.

16. The method of claim 15, wherein the predetermined policy specifies at least one of: a maximum hop count for the radio point and a link budget for some links coupled to the baseband unit.

17. The method of claim 11, wherein automatically configuring the one or more switches in the front-haul switched Ethernet network comprises automatically configuring at least one of: virtual local area networks (VLANs) for communicating timing data and in-phase and quadrature (IQ) data, quality of service (QoS), link aggregation (LA), and Internet Group Management Protocol (IGMP) snooping.

18. The method of claim 11, wherein automatically verifying the configuration of the one or more switches in the front-haul switched Ethernet network comprises performing tests that confirm that data flows in the front-haul switched Ethernet network as intended.

19. The method of claim 11, further comprising automatically validating that at least one of the discovered topology for the front-haul switched Ethernet network and the configuration of the front-haul switched Ethernet network corresponds to a network design for the front-haul switched Ethernet network.

20. The method of claim 11, wherein the method further comprises enabling a user to enter an exception to any verification or validation performed for the switched Ethernet network.

21. The system of claim 1, wherein the baseband unit comprises at least some of the circuitry.

22. The system of claim 1, wherein the system comprises a plurality of radio points including said at least one radio point, wherein the baseband unit and the plurality of radio point are configured to implement the base station in order to provide wireless service to the plurality of UEs using the cell.

23. The system of claim 1, wherein the baseband unit is configured to perform Layer-2 and some Layer-1 processing for an air interface used to wirelessly communicate with the UEs, and wherein the radio point is configured to perform Layer-1 processing for the air interface that is not performed in the baseband unit.

24. The method of claim 11, wherein the system comprises a plurality of radio points including said at least one radio point, wherein the baseband unit and the plurality of radio point are configured to implement the base station in order to provide wireless service to the plurality of UEs using the cell.

25. The method of claim 11, wherein the baseband unit is configured to perform Layer-2 and some Layer-1 processing for an air interface used to wirelessly communicate with the UEs, and wherein the radio point is configured to perform Layer-1 processing for the air interface that is not performed in the baseband unit.

\* \* \* \* \*